US006636238B1

(12) United States Patent
Amir et al.

(10) Patent No.: US 6,636,238 B1
(45) Date of Patent: Oct. 21, 2003

(54) SYSTEM AND METHOD FOR LINKING AN AUDIO STREAM WITH ACCOMPANYING TEXT MATERIAL

(75) Inventors: Arnon Amir, Cupertino, CA (US); Carlton Wayne Niblack, San Jose, CA (US); Norman Jerome Pass, Sunnyvale, CA (US); Dragutin Petkovic, Saratoga, CA (US); Dulce Beatriz Ponceleon, Palo Alto, CA (US); Savitha Srinivasan, San Jose, CA (US); Tanveer Fathima Syeda-Mahood, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/295,076

(22) Filed: Apr. 20, 1999

(51) Int. Cl.[7] ............................................. G06F 17/21
(52) U.S. Cl. ...................................... 345/730; 345/804
(58) Field of Search ................................ 345/730, 731, 345/732, 727, 728, 729, 709, 717, 719–726, 748, 749, 747, 742, 743, 802, 804–805, 808–809, 780; 707/10, 11, 104

(56) References Cited

U.S. PATENT DOCUMENTS

| 5,119,474 A | | 6/1992 | Beitel et al. ................. 395/154 |
|---|---|---|---|
| 5,274,758 A | | 12/1993 | Beitel et al. ................. 395/154 |
| 5,390,138 A | * | 2/1995 | Milne et al. ................. 345/727 |
| 5,420,974 A | | 5/1995 | Morris et al. ................ 395/154 |
| 5,434,910 A | | 7/1995 | Johnson et al. ............... 379/89 |
| 5,550,966 A | | 8/1996 | Drake et al. ................. 395/154 |
| 5,613,032 A | * | 3/1997 | Cruz et al. .................... 386/69 |
| 5,682,196 A | * | 10/1997 | Freeman ....................... 345/730 |
| 5,692,205 A | | 11/1997 | Berry et al. ................. 395/788 |
| 5,692,213 A | | 11/1997 | Goldberg et al. ............ 395/806 |
| 5,706,290 A | | 1/1998 | Shaw et al. .................. 370/465 |
| 5,742,816 A | * | 4/1998 | Barr et al. ...................... 707/3 |
| 5,745,782 A | | 4/1998 | Conway ....................... 395/806 |
| 5,799,273 A | | 8/1998 | Mitchell et al. ............. 704/235 |
| 5,835,667 A | * | 11/1998 | Wactlar et al. ................ 386/96 |
| 5,933,835 A | * | 8/1999 | Adams et al. ............... 707/104 |
| 5,969,719 A | * | 10/1999 | Tsujimoto .................... 345/717 |
| 6,148,304 A | * | 11/2000 | de Vries et al. ............. 707/104 |
| 6,249,765 B1 | * | 6/2001 | Adler et al. ................. 704/500 |
| 6,342,903 B1 | * | 1/2002 | Fado et al. .................. 345/716 |

FOREIGN PATENT DOCUMENTS

JP    07 131875    5/1919

OTHER PUBLICATIONS

Noteworthy Artware Inc., "Noteworthy Composer User Guide," Fuquay–Varina, NC, pp. 1–42.*
Bulletin: "User–Sensitive Multimedia Presentation System." IBM Technical Disclosure Bulletin. vol. 39, No. 03, pp. 93–94, Mar. 1996.
Bulletin: "Method of Scene Hierarchy Information Management for Video Image Database." IBM Technical Disclosure Bulletin. vol. 36, No. 09A, pp. 531–533. Sep. 1993.

* cited by examiner

Primary Examiner—Steven Sax
(74) Attorney, Agent, or Firm—John L. Rogitz (57) ABSTRACT

A system enables a user to query for key words and phrases a text document, such as a presentation slide file, and an associated audio stream, such as can be derived from an audio-video recording that is made of a presenter contemporaneously with the showing of the slides to an audience. A graphical user interface is presented in which query results for both the text document and the audio stream are displayed in a time-aligned format, to enable a user to easily and conveniently browse the text document and accompanying time-aligned audio stream based on the key words/phrases.

40 Claims, 7 Drawing Sheets

Fig. 1 PRESENTATION

Fig. 2 PREPROCESSING

Fig. 3 QUERY

Fig. 4
PREPROCESSING (AUDIO)
(NO TIME STAMPS)

Fig. 5
PREPROCESSING (TEXT)

Fig. 6
QUERY-NO TIME STAMP

Fig. 7

Fig. 8
PREPROCESSING (AUDIO)
(TIME STAMPS)

Fig. 9
PREPROCESSING (TEXT)

Fig. 10
QUERY W/ TIME STAMPS

SYSTEM AND METHOD FOR LINKING AN AUDIO STREAM WITH ACCOMPANYING TEXT MATERIAL

BACKGROUND OF THE INVENTION

1. Field of the Invention

The present invention relates generally to computer-stored data access and search, and more particularly to accessing and searching for computer-stored presentations that include both audio/video and related textual information, such as a text document, speech transcript, or slide presentation.

2. Description of the Related Art

Frequently, speakers at symposia and other venues are videotaped as they present their lecture, often accompanied by a slide presentation. The slide presentations increasingly are computer-generated by programs such as Lotus Freelance® or Microsoft Power Point®, in which a presenter can couple a laptop computer with a large screen to cause computer-stored slides (referred to in this context as "slides") to be displayed on the screen in front of the audience in response to manipulation of the laptop computer by the presenter.

In the above example, the recorded presentation can be thought of as consisting of two related, contemporaneous components —the audio video recording, which can be digitized and electronically stored, and the textual information represented by the slides, which are often also stored for future reference. A person wanting to replay the entire presentation would accordingly desire to recall both the audio visual recording, and the accompanying slide presentation.

It is to be appreciated that in the above example, while the slide presentation is contemporaneous with the audio-visual presentation and indeed is usually the subject of the speaker's remarks, the slide presentation is not necessarily tightly coupled to in time with the audio-visual presentation. Stated differently, a conventional video recording, if the camera was focused on the speaker, cannot "know" what slides in the computer-generated slide presentation were presented when by the speaker. As discussed above, however, a person who subsequently accesses a presentation database might indeed want to play back the video presentation along with playing back the slides contemporaneously with the video segments with which the slides were displayed during the original lecture, or may want to search for portions of the presentation including particular text in the audio and/or slides.

Prior systems have not addressed the above-noted consideration. For example, European publication EP0820025A1 discloses a method for automatically presenting a closed caption on a compressed video program, but nowhere does it consider linking audio (from, e.g., an audio/video source) with a related text source. Japanese publications JP8063184A and JP808729A extract text from an audio track using speech recognition principles, but these publications do not appear to consider linking independently generated text with a contemporaneous audio stream.

As still another example, U.S. Pat. No. 5,550,966, owned by the present assignee, is an effective solution for its intended purpose, namely, efficiently constructing and maintaining a library of videos of slide presentations, but it does not consider linking audio derived from a videotape of a person with accompanying text, such as a slide presentation. Instead, the purpose of the '966 patent is to effectively and efficiently manage access to a video database for retrieving entire videos having only a single component —the slide presentations themselves — while reducing data storage requirements by maintaining only a single video frame of each slide. In contrast, the present invention is directed to navigating, searching, and browsing within the components of a presentation that can have multiple sources, and in particular, though not exclusively, audio derived from video, and an accompanying textual document such as a slide presentation.

SUMMARY OF THE INVENTION

The invention is a general purpose computer programmed according to the inventive steps herein to query, retrieve, and browse audio streams as can be derived from audio-video recordings along with text documents, such as slide presentation files, that are associated with the audio streams. The invention can also be embodied as an article of manufacture —a machine component —that is used by a digital processing apparatus and which tangibly embodies a program of instructions that are executable by the digital processing apparatus to undertake the present logic. This invention is realized in a critical machine component that causes a digital processing apparatus to perform the inventive method steps herein. In other aspects, a computer program product is disclosed which is readable by a digital processing apparatus and which tangibly embodies a computer program. The computer program product combines a computer readable medium with program code elements that undertake the logic disclosed below. And, a computer-implemented method is disclosed for executing the logic herein.

Accordingly, in one aspect a query system includes means for accessing at least one text document including at least one slide, and means for accessing at least one audio stream generated contemporaneously with a large screen display of the slide. A user can specify at least one query word or phrase, and in response the system presents in summary form at least some occurrences, if any, of the word or phrase in the text document and the audio stream.

In another aspect, the means for presenting further presents timing information that is common to the text document and the audio stream. Also, at least one temporal relationship can be presented between occurrences of the word or phrase in the audio stream and occurrences of the word or phrase in the text document.

In another aspect, a computer-implemented method is disclosed for associating audio from at least one audio source with at least one text document relating to the audio, with the text document having been presented contemporaneously with the generation of the audio. The method includes linking the audio with the text document, and then associating at least portions of the audio with respective portions of the text document such that associated portions can be presented simultaneously on a computer output device.

Preferably, the method also includes extracting at least one of: text, and keywords, from the audio along with timing information representative of the temporal location of at least some of the text and keywords in the audio. The method also extracts at least one of: text, and keywords, from the text document along with position information representative of the position of at least some of the text and keywords in the text document. As set forth in greater detail below, for at least portions of the text document, information is determined that represents times when the portions were presented on a large screen display. Moreover, for at least portions of the text document, the method determines information representative of times when the portions were removed from a large screen display.

In the presently preferred embodiment, the linking step is accomplished by associating at least a first portion of the text document with at least a first portion of the audio when both first portions include at least one key word in the user query. Or, the linking step can be accomplished by associating at least a first portion of the text document with at least a first portion of the audio when both first portions contain identical time stamps. The time stamps can include at least one of: discrete times, and discrete time periods.

In another aspect, a computer system includes a data store holding at least one audio stream and at least one text source. The audio stream is based on audio that is associated with the text of the text source. A processor receives a query for data in the audio stream or text source and in response enables a user to access at least portions of the audio stream and text source or symbols representative of one or more thereof simultaneously.

In still another aspect, a computer program product includes a computer program storage device readable by a computer, and a program means on the program storage device. The program means includes program code elements that embody instructions which are executable by the computer for performing method steps for associating at least portions of a text document with at least portions of an audio signal or transcript of the audio signal. The audio signal has been generated contemporaneously with a large screen display of the text document. The method steps undertaken by the program means include simultaneously presenting, via a computer output device, at least symbols representative of the text document and audio signal to a user, such that the user can navigate between the text document and audio signal.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
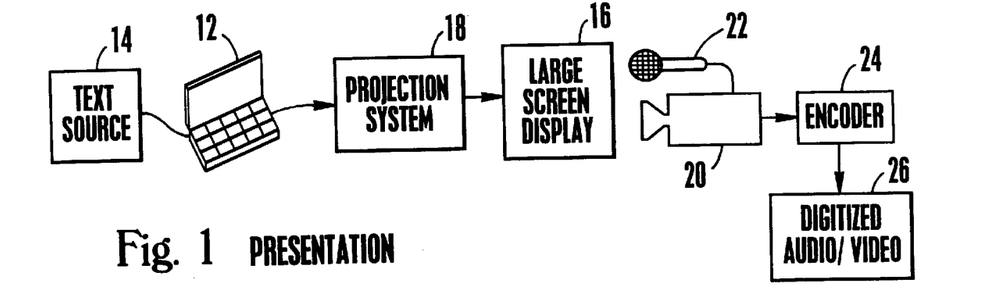
FIG. 1 is a schematic diagram of the presentation hardware of the present system.
Figure 2:
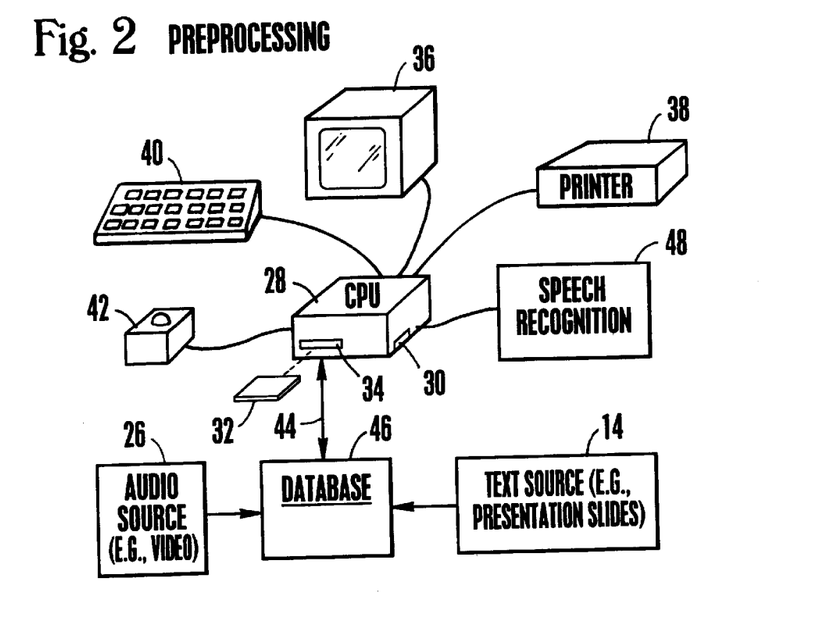
FIG. 2 is a schematic diagram of the preprocessing/indexing hardware of the present system.
Figure 3:
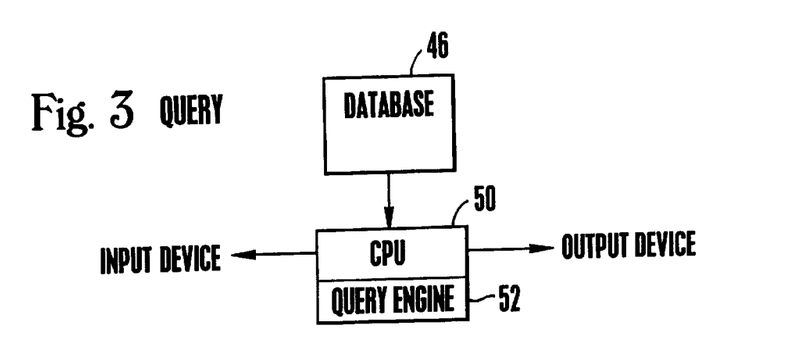
FIG. 3 is a schematic diagram of the query hardware of the present system.

FIGS. 1–3 show various hardware architectures of a system, generally designated 10, for generating audio streams (derived from, e.g., the audio content of audio-video data) and related text documents and then for indexing the audio streams with accompanying text documents and subsequently searching the indices. Specifically, FIG. 1 shows a hardware architecture including a laptop or other computer 12 that accesses a text source 14, such as a slide presentation file, for presenting slides on a wide screen display 16 using a conventional projection system 18. In other embodiments, other display devices could be used, e.g., an overhead projector, an electronic flat display, a wide television screen, and so on. As the slides are being presented, an audio stream, the subject matter of which relates to the slides, is contemporaneously generated. In one preferred embodiment, the audio stream is generated as part of an audio/video recording made by a video camera 20 with associated microphone 22, with the recording being digitized by an encoder 24 that can be part of the camera 20 to generate digitized audio/video streams 26. In another embodiment, the audio stream is generated as part of an audio/video recording made by a VCR with associated microphone 22, and with the video being recorded directly from the presentation and display device 12, such as a computer.

After recording the audio streams, it is the purpose of the present invention to index the streams and text documents in accordance with the content thereof and store the streams, along with the related text documents, for subsequent query-based searching of the streams and text documents. Accordingly, FIG. 2 shows that a digital processing apparatus such as a preprocessing/indexing computer 28 can be provided for the indexing of the audio streams and text documents. In one intended embodiment, the computer 28 may be a personal computer made by International Business Machines Corporation (IBM) of Armonk, N.Y. as shown, or the computer 28 may be any computer, including computers sold under trademarks such as AS400, with accompanying IBM Network Stations. Or, the computer 28 may be a Unix computer, or OS/2 server, or Windows NT server, or IBM RS/6000 250 workstation with 128 MB of main memory running AIX 3.2.5., or an IBM laptop or palm top computer.

The computer 28 includes an indexing engine 30, schematically shown in FIG. 2, which may be executed by a processor within the computer 28 as a series of computer-executable instructions. These instructions may reside, for example, in RAM of the computer 28.

Alternatively, the instructions may be contained on a data storage device with a computer readable medium, such as a computer diskette 32 shown in FIG. 2 that is engageable with a floppy disk drive 34 of the computer 28. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of C++ code.

FIG. 2 also shows that the system can include peripheral computer equipment known in the art, including an output device such as a video monitor 36 and/or printer 38 and an input device such as a computer keyboard 40 and/or mouse 42. Other output devices can be used, such as other computers, audio speakers, and so on. Likewise, input devices other than the keyboard 22 and mouse 24 can be used, e.g., trackballs, keypads, touch screens, and voice recognition devices.

The computer 28 can access, via a data transmission path 44, an electronically-stored database or data store 46 that contains audio data such as audio streams from, e.g., the audio source 26. It is to be understood that the audio data can be input directly to the indexing engine 30 from the audio source 26, which, as mentioned above, can be a source of analog or digitized audio, such as, e.g., an audio stream from an audio/video recording or a broadcast network or radio station. Thus, the term "audio" includes, but is not limited to, digital audio recordings and transcripts thereof.

It is to be further understood that the database 46 can be locally stored on the computer 28, in which case the path 44 is an internal computer bus, or the database 46 can be remote from the computer 28, in which case the path 44 is a local area network or wide area network such as the Internet. For purposes to be described shortly, the indexing engine 30 access a speech recognition engine 48. The speech recognition engine 48 can be any suitable speech recognition engine, such as, e.g., the one disclosed in U.S. Pat. No. 5,293,584, owned by the same assignee as the present invention and incorporated herein by reference. The speech recognition engine 48 can be the present assignee's "Large Vocabulary Continuous Speech Recognition" system.

Additionally, the indexing engine 30 accesses, through the database 46 if desired, text documents including text objects from the text source 14. The text documents can be a file or files of presentation slides, such as Lotus Freelance® or Microsoft PowerPoint® slides. It is to be understood, however, that a text document may include, but not be limited to, text derived from foils, text and special marks included in closed caption video, text extracted from video by an automatic character recognition technique or system, a transcript, a translated transcript, annotations, lecture notes, embedded citations, links and references, and meta-data of multimedia content.

Although a laptop computer 12 is shown in FIG. 1 as the presentation device, it is to be understood that a single computer can undertake presentation, indexing, and querying if desired. Accordingly, images of the slides can have been or can subsequently be displayed by the computer 28 or other computer on the large screen display 16, as well as on the monitor 36. It may now be appreciated that the text document from the text source 14 can have been slides that were displayed by a presenter on the large screen display 16 and then stored in digital form in the database 46, while a digitized audio stream from an audio/video recording of a presenter, made contemporaneously with the presenter showing the slides on the large screen display 16, can be derived from the audio source 26 and stored in the database 46.

As disclosed in detail below, the computer 28 uses the indexing engine 30 to index the audio streams and text documents based on the content thereof. The indices so generated in accordance with below disclosure are also stored in the database 46.

FIG. 3 shows that a query CPU 50, which can be the computer 28 shown in FIG. 2 or another user computer, can access the database 46. Using a query engine 52 that may be executed by the CPU 50 as a series of computer-executable instructions which can reside, for example, in RAM of the CPU 50, a user can manipulate an input device to query for particular words or phrases in the audio streams and text documents in the database 46. Summaries of the query results performed on the audio streams with related text documents are presented as set forth below on an output device such as a computer monitor in response to user queries.

Figure 4:
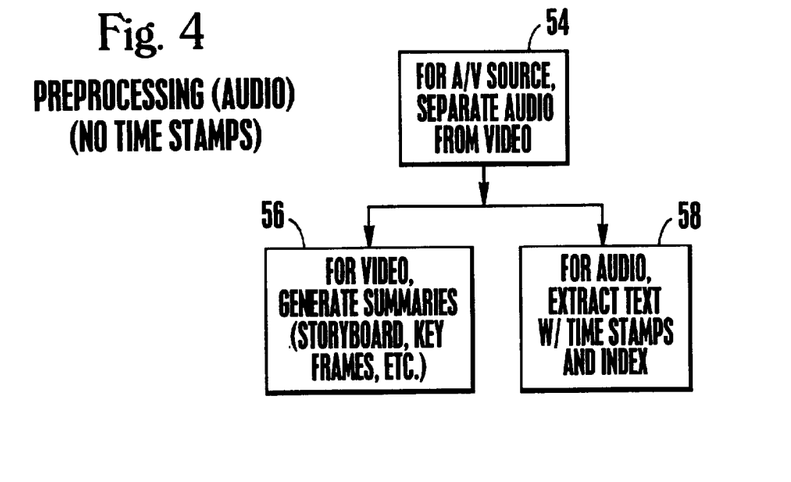
FIG. 4 is a flow chart of the logic for preprocessing audio streams.

Now referring to FIG. 4, the logic of one method for indexing audio from the audio source 28 along with a text document relating to the audio from the text source 14 can be seen. Commencing at block 54, when the source of the audio stream is an audio/video source, the video is separated from the audio. At block 56, for the video, summaries of the video are generated. These summaries can include storyboards, key frames, etc. and can be used not only for purposes of FIGS. 4–7 but also for generating the key frame thumbnails shown in FIG. 7 as well. The key frames can be generated every few seconds (e.g., every four seconds) of the audio stream, or they can be generated using other appropriate criteria. Moving to block 58, for the audio, text is generated by the speech recognition engine 48 (FIG. 2) and extracted. If desired, this text can then be indexed by words/phrases, i.e., by context, and the text is stored along with associated time stamps preferably for each word. For the audio stream, the time stamps are received from the stream itself, because audio files inherently contain timing information relative to the starting point of the stream.

Figure 5:
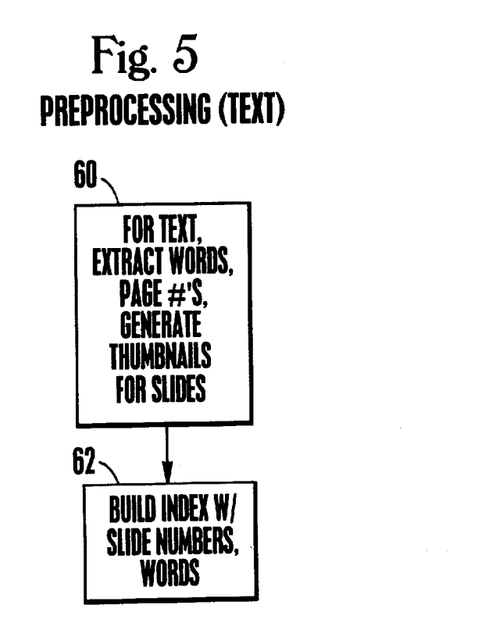
FIG. 5 is a flow chart of the logic for preprocessing text documents that are related to the audio streams preprocessed in FIG. 4, without using time as the linking attribute.

Continuing to block 60 in FIG. 5, for the text document words are extracted along with their respective page numbers. Also, thumbnail images are generated for slides, when the text document is a slide presentation file. Moving to block 62, an index is built of the words and/or phrases in the text document, and the words/phrases are indexed along with associated page/slide numbers, if any. The audio stream can be annotated in the database 46 as being associated with the text document, or the association of the text document with the audio stream can be undertaken at query time in response to the query.

After having indexed the audio streams and associated text documents and storing the indices, streams, and documents in the database 46, it might be desired to query the streams and text documents for particular words/phrases. The database 46 accordingly is made available to the query CPU 50, and a user can enter a query into the CPU 50 using an appropriate input device to cause the query engine 52 to retrieve the requested words/phrases.

Figure 6:
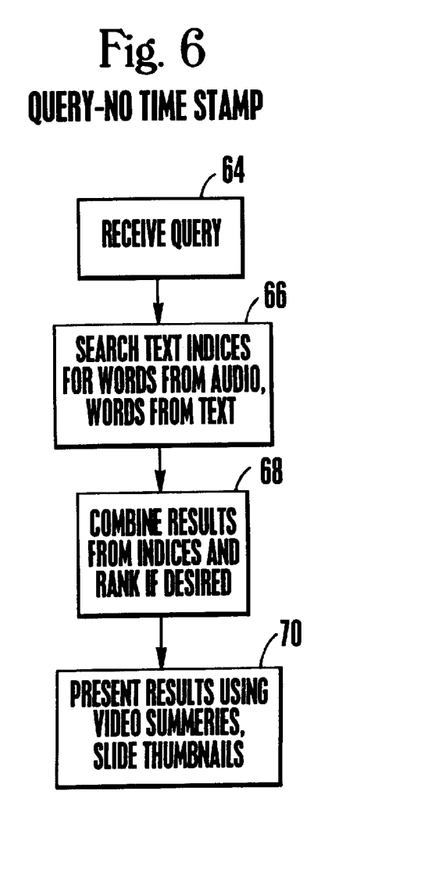
FIG. 6 is a flow chart showing the logic for presenting text document summaries juxtaposed with an audio stream timeline based on a user query.

To understand one method for querying and presenting summaries of audio streams along with summaries of associated text documents, reference is now made to FIG. 6, Commencing at block 64, a query from the user as generated by an input device of the present invention is received. At block 66, the database 46 is accessed, and the query word or phrase is compared to the indices for matches. In other words, the indices in the database 46 are searched at block 66 for query words/phrases. Moving to block 68, the results of the comparison are combined and, if desired, ranked in accordance with query results ranking principles set forth further below. Accordingly, the step at block 68 can be thought of as linking at least portions of a text document with portions of an audio stream based on the retrieved results. Then, at block 70 the results are presented on an output device of the present invention, such as the monitor 36, preferably using audio/video summaries or symbols representative thereof, along with slide thumbnails (when the text document is a file or files of presentation slides).

Figure 7:
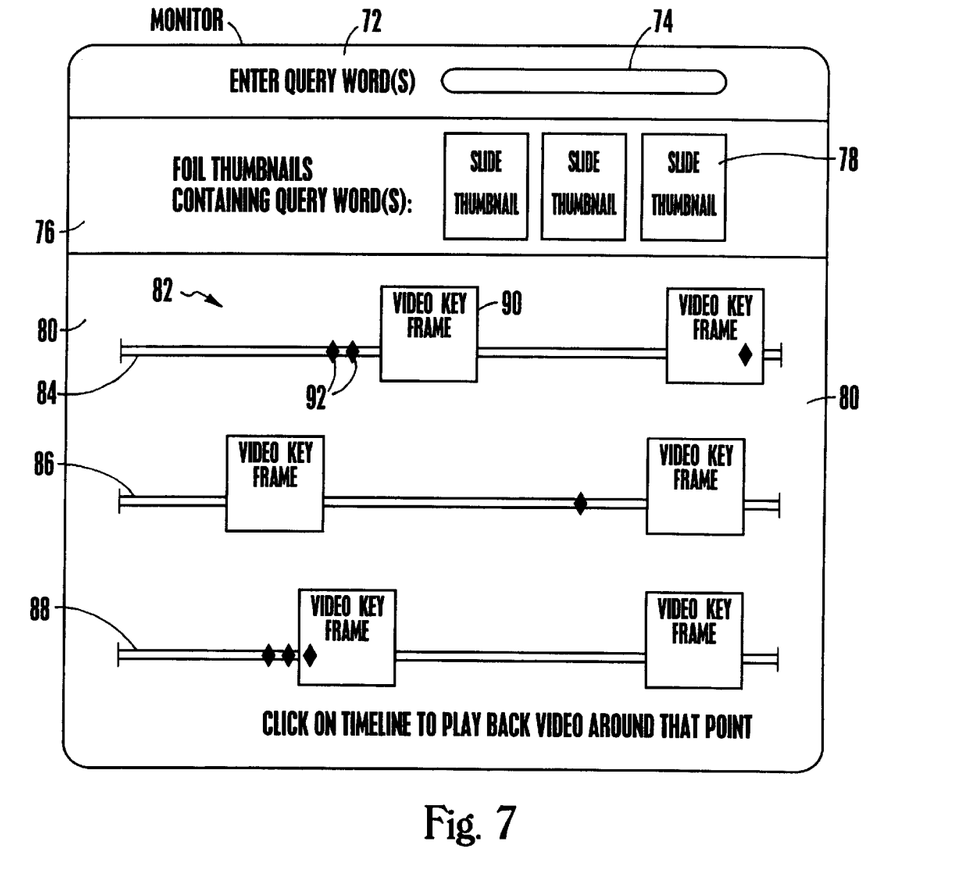
FIG. 7 is an example user interface generated by the logic of FIGS. 4–6.

FIG. 7 shows an exemplary user interface generated by the logic illustrated in FIGS. 4–6. As shown, a query area 72 can be presented near the top of the display of a monitor, with the query area 72 having a query input window 74 into which a user can type one or more key words or phrases. Below the query area 72, a text document summary area 76 can be presented for presenting summaries 78 of portions of the text document being queried. In one preferred embodiment, the text document is a slide presentation file. Accordingly, in this embodiment the summaries 78 can be established by thumbnails of the slides as shown, although other symbols can be used.

In the particular embodiment shown in FIG. 7, an audio summary area 80 is located below the text document summary area 76. The audio summary area 80 can include one or more symbols, generally designated 82, representing the audio stream being queried. In the embodiment shown, the audio summary symbols 82 include top, middle, and bottom audio timelines 84, 86, 88, it being understood that the bottom timeline 88 is a temporal continuation of the middle timeline 86, which in turn is a continuation of the top timeline 84. Greater or fewer timelines can be used, depending on the length of the audio stream.

Furthermore, when the audio stream has been extracted from an audio/video file, the symbols 80 can include thumbnails of video key frames 90. The thumbnails are generated in accordance with key frame generation principles known in the art. If desired, the key frames 90 can be located on a video timeline that is separate from the audio timeline, but more preferably the key frames 90 are presented on the locations of the audio timelines 84, 86, 88 that temporally correspond to the key frames 90. The key frames 90 can be arranged along the audio timeline every few seconds or according to some other appropriate standard.

In accordance with the present invention, locations in the audio stream that contain query terms are visually represented by query satisfaction symbols 92. The symbols 92 can be overlaid on video key frames 90 with which the symbols 92 are contemporaneous. In the preferred embodiment, the query satisfaction symbols 92 are diamonds, although other symbols can be used. It is to be understood that the query satisfaction symbols 92 essentially are a summary form of occurrences of the query word or phrase in the audio stream, whereas the summaries 78 are a summary form of occurrences of the query word or phrase in the text document.

With this disclosure in mind, it will readily be appreciated that the symbols and summaries are juxtaposed with each other on the display of the monitor. A user can click on a text document summary 78 to see an enlarged version of, e.g., a slide containing a query term, and/or the user can click on a key frame 90 or query satisfaction symbol 92 to replay a clip of the audio and/or audio/video file that contains the query term while the text document symbols 78 simultaneously are being displayed. The clip can include, for example, five seconds before and after the query term was spoken in the audio stream. In this way, occurrences of the query word or phrase in the text document and the audio stream are presented. In any case, the text document summaries 78 are linked to the audio symbols 84 (and, when provided, the video key frame thumbnails 90) by means of the user query, as represented in the audio symbols 84 by the query satisfaction symbols 92. In other words, a user can access at least portions of an audio stream and a text source (or symbols representative of one or more thereof) simultaneously. And, the user can easily and efficiently navigate between the text document and audio stream using the user interface shown in FIG. 7.

Now referring to FIGS. 8–11, the logic of another method for associating audio from the audio source 26 with a text document relating to the audio from the text source 14 can be seen. Commencing at block 94 in FIG. 8, when the source of the audio stream is an audio/video source, the video is separated from the audio. At block 96, for the video portion, summaries of the video are generated.

Figure 8:
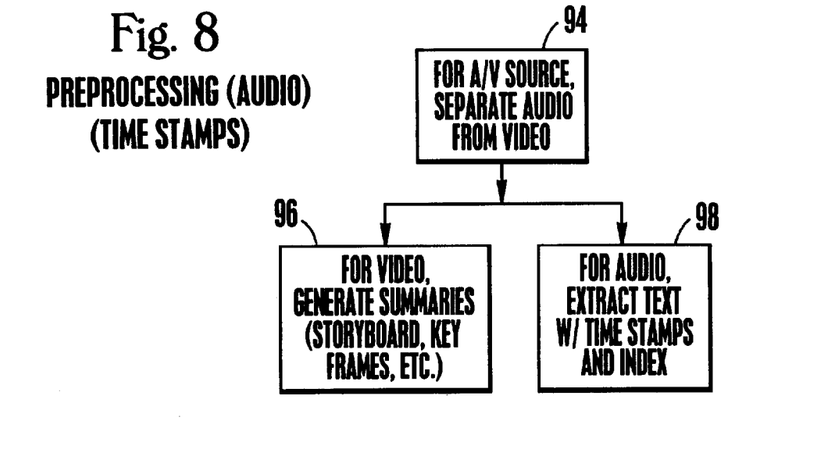
FIG. 8 is a flow chart of the logic for preprocessing audio streams using a second method.

Moving to block 98, for the audio portions, text is generated by the speech recognition engine 48 (FIG. 2) and extracted, along with associated time stamps preferably for each word. The text with time stamps are indexed as part of a text index of the audio stream.

As intended herein, time stamps include at least one of: discrete times, and discrete time periods, during which the words of the text were uttered. When associated with presentation slides as disclosed below, time stamps can include the times at which the presentation slides were both initially displayed on, e.g., the large screen display 16 (FIG. 1) and removed therefrom.

For the audio stream, the time stamps are received from the stream itself, because audio files inherently contain timing information relative to the starting point of the stream. Thus, once the actual time of the starting point is established, the time of subsequent segments in the stream is known. The starting point can be manually recorded and saved with the audio file. Or, the starting time of the stream can be computed using the method disclosed in the above-referenced U.S. Pat. No. 5,550,966, in which the time at which a slide in a presentation is initially displayed is determined from a video recording of the display. This suggests that a video is taken only of the large scale display of the slide, and does not consider other subject matter such as the speaker, the stage, and so on as is otherwise contemplated herein. As still another alternative, many video recorders include clocks. The clock of the videorecorder can be properly set to correct time prior to recording, and then timing information relative to the starting point of the audio/video stream can be extracted from the videorecorder along with the audio/video file.

Figure 9:
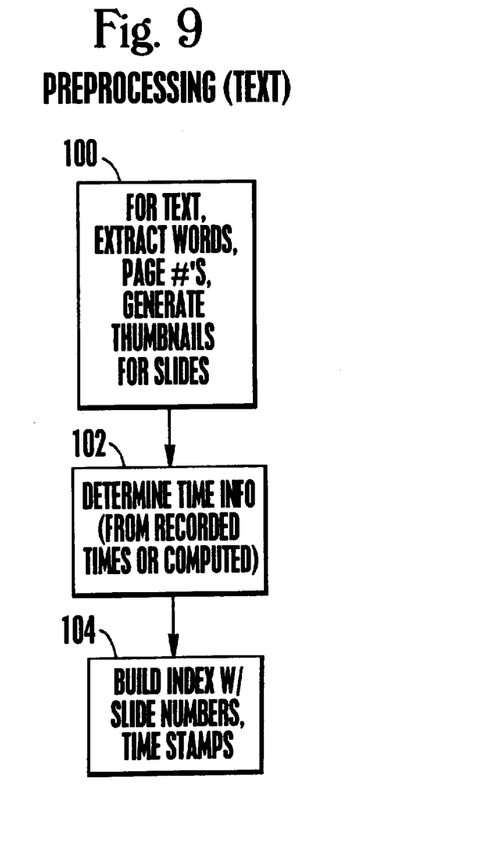
FIG. 9 is a flow chart of the logic for preprocessing text documents, such as slides, that are in a temporally contemporaneous relationship with the audio streams in FIG. 8.

Continuing to block 100 in FIG. 9, for the text document words are extracted along with their respective page numbers. Also, thumbnail images are generated for slides, when the text document is a slide presentation file. Moving to block 102, timing information is determined for the text document pages, e.g., for the slides of a slide presentation.

The timing information such as time stamps can be received from the application that is used for the text document. For example, when the text document is a slide presentation file, the presentation application may record the times when a slide is presented and removed from a display, and this information can be extracted from the application to establish the time stamps. The application timing information can be absolute or relative. Many applications such as Lotus' Freelance or Microsoft's PowerPoint may be run in a mode that records the transition times of each slide. Or, the transition times can be computed from video using, e.g., the method described in the above-referenced U.S. Pat. No. 5,550,966, it being understood that a second video source recording the display of the slides as required by the '966 patent might be required in addition to the present video of the presenter, or stage, or other non-slide display subject that nevertheless is related to the subject matter of the slides.

When the timing information is relative to, e.g., a starting point of the file, the time stamps of the text document can be synchronized with the time stamps of the audio stream by establishing the correct actual time of the starting point. One of the above-mentioned methods may be used for this purpose. As was the case for the related audio stream, at block 104 of FIG. 8 an index of the text document is built, e.g., an index of slide numbers, along with accompanying time stamps.

Figure 10:
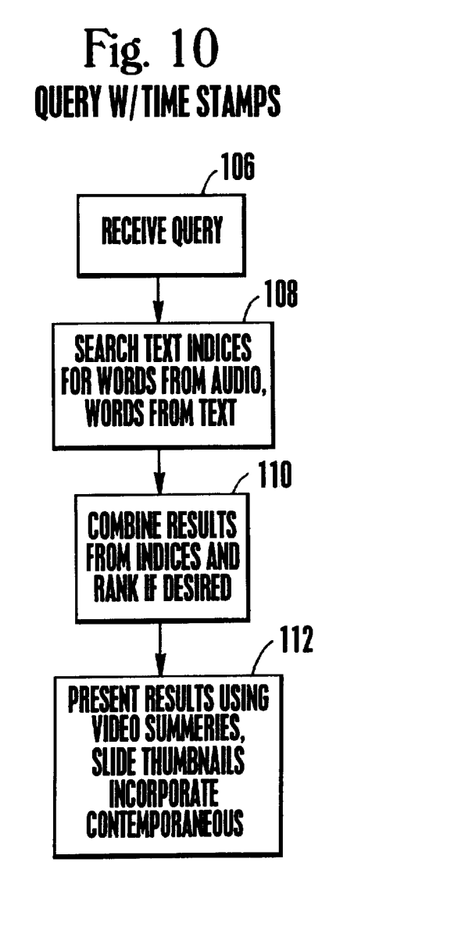
FIG. 10 is a flow chart showing the logic for presenting text document summaries juxtaposed with an audio stream timeline based on a user query.

Now referring to FIG. 10, the logic of a method for linking or otherwise associating audio from the audio source 26 with a text document relating to the audio from the text source 14 using timing information can be seen. Commencing at block 106, a query from the user is received. Moving to block 108, the audio text index and text document index that were generated in FIGS. 8 and 9 above are searched for query words/phrases. Stated differently, at block 108 the query word or phrase is compared to the indices for matches, with the results of the comparison being combined and, if desired, ranked at block 110 in accordance with query results ranking principles described below, where similar or corresponding timestamps may also be a criteria in the rankings. Then, at block 112 the results are presented on an output device of the present invention, such as the monitor 36, preferably using audio/video summaries or symbols representative thereof, along with slide thumbnails (when the text document is a file or files of presentation slides). As discussed below, the presentation at block 112 includes indications of contemporaneous occurrences of slide presentations with the speaking of query terms. The contemporaneously presented slides may or may not contain the query terms. This depends on the ranking principles used. For example, the assigned rank of a slide that contains the query word and has a timestamp corresponding to the audio segment containing the query word can be higher than the rank assigned to a slide that contains the query word but does not have a timestamp corresponding to the audio segment. In any case, a slide can be displayed in response to a query using an appropriate slide displaying software, or the slide's content can be displayed using other formats by, e.g., converting the slide to Hypertext Markup Language (HTML) or other mark up language (XML, e.g.).

Figure 11:
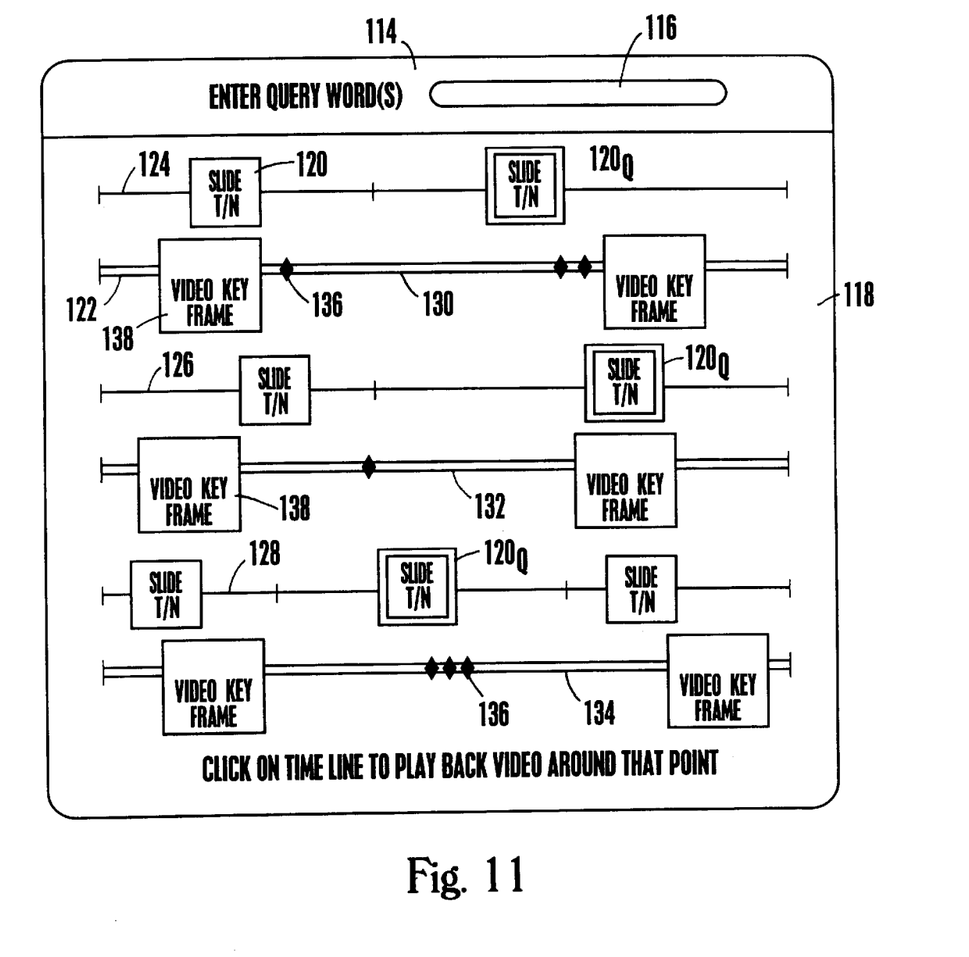
FIG. 11 is an example user interface generated by the logic of FIGS. 8–10.

FIG. 11 shows an exemplary user interface generated by the logic illustrated in FIGS. 8–10. As shown, a query area 114 can be presented near the top of the display of the monitor, with the query area 114 having a query input window 116 into which a user can type one or more key words or phrases. Below the query area 114, a combined text document summary and audio summary area 118 can be presented for presenting summaries 120 of portions of the text document being queried in a time-aligned format with one or more audio summary symbols 122 representing the audio stream that is related to the text document.

When the text document is a slide presentation file, the summaries 120 can be established by the thumbnails generated as described above, although other symbols can be used. Unlike FIGS. 4 and 5, the timing information derived in FIGS. 8 and 9 above is used to present the slides along a slide timeline, which can be presented as, e.g., top, middle, and bottom slide timelines 124, 126, 128, depending on the length of the accompanying audio file. Preferably, each slide in the text document is presented on the slide timeline, regardless of whether the slide satisfies the query. When a slide satisfies a query, it is so indicated by, e.g., enclosing its associated thumbnail in a double lined box, as shown for the three thumbnails labelled $120_Q$.

Furthermore, in the embodiment shown the audio summary symbols 122 include combined top, middle, and bottom audio/video timelines 130, 132, 134, it being understood that the bottom timeline 134 is a temporal continuation of the middle timeline 132, which in turn is a continuation of the top timeline 130. Greater or fewer timelines can be used, depending on the length of the audio stream. If desired, each audio summary symbol 122 can alternatively include separate audio and video timelines as described above in reference to FIG. 3.

In any case, the combined audio/video timelines 130, 132, 134 are juxtaposed with the slide timelines 124, 126, 128, such that the audio and slide timelines are temporally aligned with each other. In other words, a particular slide thumbnail is presented on the slide timeline at a position that corresponds to the actual time it was either first presented or removed from the large screen display, with the audio timeline being aligned with the slide timeline such that the portions of the audio timeline directly below the particular slide represents the words being spoken by a presenter (and a video image of the presenter, for audio/video files) at the time the particular slide was being displayed. Whether the slide contains the query words can depend on the ranking criteria used. The juxtaposed, temporally-aligned timelines thus represent timing information that is common to the text document and the audio stream.

In accordance with the present invention, locations in the audio stream that contain query terms are visually represented by query satisfaction symbols 136. In the preferred embodiment, the query satisfaction symbols 136 are diamonds, although other symbols can be used. As was the case with the user interface shown in FIG. 7, if desired, video key frames 138 can be superimposed on the combined audio/video timelines 130, 132, 134 where temporally appropriate.

With this disclosure in mind, it will readily be appreciated that the symbols and summaries are juxtaposed with each other on the display of a monitor. A user can click on a text document summary 120 to see an enlarged version of, e.g., a slide containing a query term or to see a slide that happens to be juxtaposed with a portion of the audio timeline on which a query satisfaction symbol 136 is displayed. Or, the user can click on a portion of the audio timeline that might, e.g., display a query satisfaction symbol 136 to replay a clip of the audio and/or audio/video file that contains the query term while the text document symbols 120 are being simultaneously being displayed, as more fully set forth below in reference to FIG. 13. In this way, occurrences of the query word or phrase in the text document and the audio stream are presented. In any case, the text document summaries 120 are linked to the audio symbols 122 by time stamps that can be discrete times or time periods, with temporal relationships between occurrences of the word or phrase in the audio stream and occurrences of the word or phrase in the text document being readily apparent by looking at the timelines, query satisfaction symbols 136, and double lined symbols $120_Q$.

Figure 12:
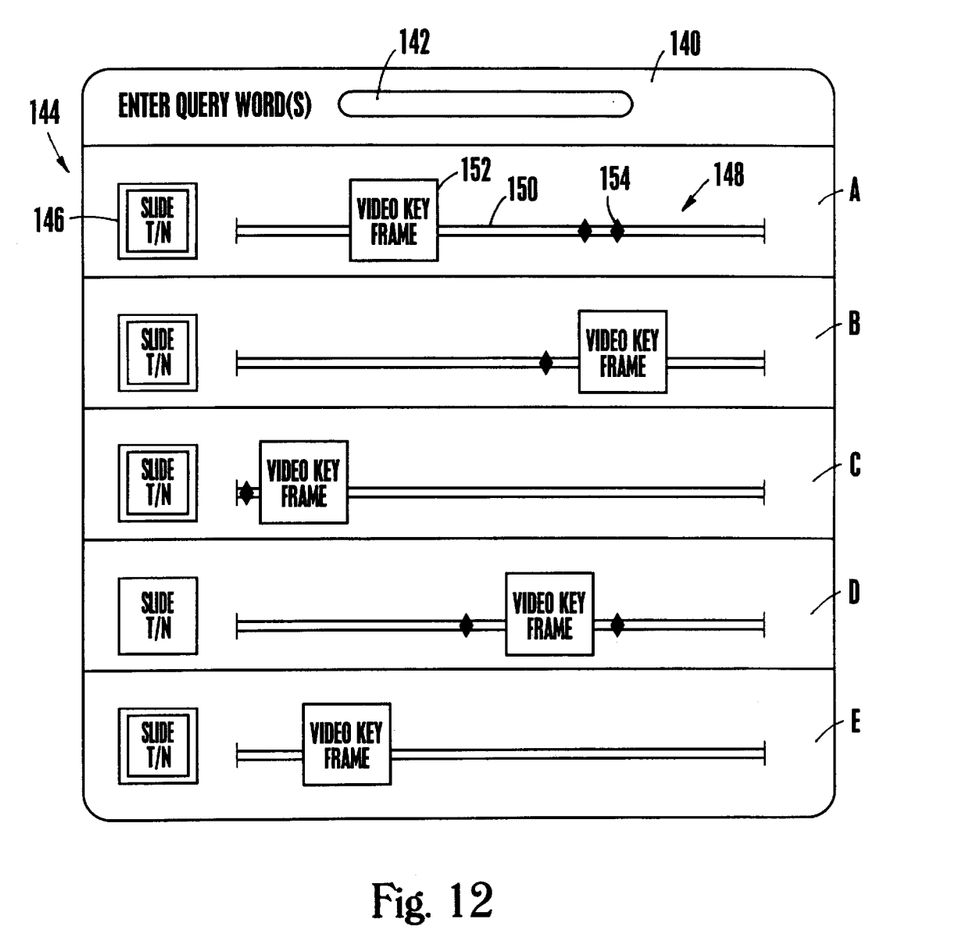
FIG. 12 is another example user interface.

FIG. 12 shows an exemplary user interface generated by the above logic, but showing a ranking presentation by relevance. As shown, a query area 140 can be presented near the top of the display of the monitor, with the query area 140 having a query input window 142 into which a user can type one or more key words or phrases. Below the query area 140, a combined text document summary and audio summary area 144 can be presented for presenting summaries 146 of portions of the text document being queried alongside one or more audio summary symbols 148 representing the audio stream that is related to the text document. It will be readily appreciated that each audio summary symbol 148 includes an audio timeline 150 over which can be superimposed one or more video keyframes 152 and one or more query satisfaction symbols 154. Without loss of generality, audio summaries are sometimes referred to as "audio segments" or "segments" and text document summaries are sometimes referred to as "slides", for illustration purposes.

Unlike the previous user interfaces, results of queries in FIG. 12 are shown in pairs, each pair including a respective text document summary 146 and audio summary symbol 148. The slide summary indicates (using a double line or single line in accordance with above principles) whether the query word(s) appear in the slide, and the video summary 148 indicates, by appropriate placement of the query satisfaction symbols 154 in accordance with above principles, whether and where the query word(s) appear in the audio stream. Results are shown in ranked order, with more highly relevant pairs being located higher on the display than lower ranked pairs. Thus, pair "A" in FIG. 12 has been more highly ranked, in terms of query relevance, than pair "B", which has in turn been more highly ranked than pair "C", and so on to pair "E", the lowest ranking pair. It is not necessary that a text summary 146 be in the same interval as the corresponding audio summary 148; however, when the text summary 146 is in the same interval as the audio summary 148 of the pair, the relevancy ranking of the pair is higher than it would be otherwise, as disclosed further below.

It is to be understood that a ranked pair A–E might include a slide that does not satisfy the query, as indicated for the text document summary 146 of pair "D". Also, a ranked pair A–E might include an audio stream that does not satisfy the query, as indicated for the audio summary symbol 148 of pair "E". Indeed, neither summary 146, 148 of a ranked pair might include a query term.

To rank the pairs, the query results are computed using a representative scoring method. The audio stream is broken down into audio segments where each segment is a chunk of the audio stream between slide transition times. Each stream chunk is scored against the query word/phrase. All audio segments and all slides can be scored using the so-called "Okapi" formula as follows:

if $\alpha_1 = 0.5$ and $\alpha_2 = 1.5$ (empirically determined);

$1_s$=length of segment/slide in words;

$1_{bar}$=mean length of the words in the segments/slides in the collection;

$q_k = k^{th}$ term in the query;

Q= total number of terms in query;

$C_q(q_k)$=count of the $k^{th}$ term in the query "q";

$C_s(q_k)$=count of the $k^{th}$ term in the segment/slide;

N=total number of documents;

$n(q_k)$=number of segments/slides that contain the term $q_k$; and inverse segment/slide frequency for the $k^{th}$ query term= isf($q_k$) is:

isf($q_k$)=log $\{(N-n(q_k)+\alpha_1)/(n(q_k)+\alpha_1)\}$ then the relevance score of the segment/slide against the query "q"=S(s,q):

S(s,q)=sum from k=1 to Q of $\{C_q(q_k) * C_s(q_k) * isf(q_k)\} / \{\alpha_1 + (\alpha_2(1_s/I_{bar})) + C_s(q_k)\}$ The total relevancy score for the query string is the combined score of each of the query words in each slide/segment pair. The scoring function accounts for the number of times each query term occurs in the segment or slide, normalized with respect to the number of words in the segment or slide, to remove bias that would otherwise favor segments or slides with more words. The above function also favors terms that are specific to a segment/slide and rare across other segments/slides.

The relevant audio segments and slides are then ranked to establish the query results. In accordance with the present invention, ordinarily pairs of segments/slides are ranked in descending order of relevancy scores as shown in FIG. 12. In our invention, however, the ranking procedure is further modified such that an audio segment-slide pair that lie within the same time interval is ranked higher than a pair in which the segment is not in the same interval as the slide.

While the user interface shown in FIG. 12 does not show the text document (slide) summaries along a timeline, it is to be understood that slides and audio segments can be shown along respective timelines, to include a relevancy indicator for each pair in the result set based on above principles. In such an interface, the slides and audio segments that satisfy the query are juxtaposed along the respective timelines.

Figure 13:
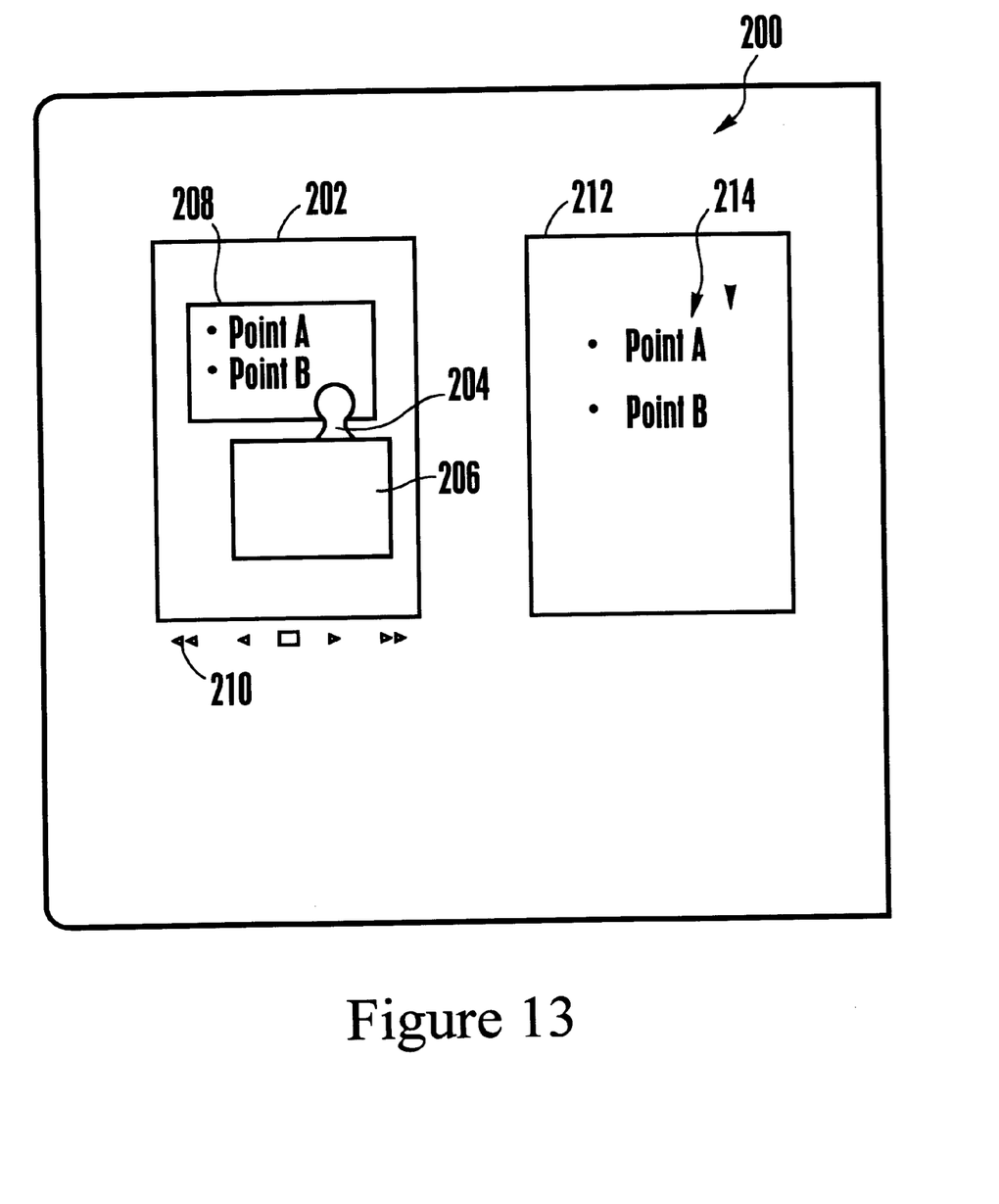
FIG. 13 is an example playback screen.

FIG. 13 shows a user interface display 200 that can be presented to a user when the user clicks on, e.g., a video key frame in FIG. 11 or 12. As shown, a video window 202 is presented which displays a video clip represented by the symbol that had been clicked on in FIG. 11 or 12. The video clip might be, e.g., a clip of a presenter 204 behind a podium 206 speaking about points "A" and "B" that are displayed on a large screen 208. VCR-like controls 210 are provided that the user can click on to fast forward, pause, rewind, etc. the clip.

Alongside the video window 202, a text window 212 is displayed. The text window 212 presents portions 214 of the text document that were displayed contemporaneously with the generation of the video clip being displayed. As the video clip is played back, the text window 212 displays text in synchronization with the video clip in the video window 202. Accordingly, when, e.g., the text document is established by a slide presentation, the slide presented in the text window 212 changes to another slide when slide changes in the video window 202 occur.

While the particular SYSTEM AND METHOD FOR LINKING AN AUDIO STREAM WITH ACCOMPANYING TEXT MATERIAL as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A computer implemented system for automatically associating audio from at least one audio source with text from at least one text document related to the audio, the system including a query system comprising:

means or accessing at least one text document;

means for accessing at least one audio stream generated contemporaneously with a display of at least a portion of the text document;

means for automatically associating at least portions of the audio with at least respective portions of the text document;

means for permitting a user to specify at least one query word or phrase using a computer input device;

means for presenting in summary form, on a computer output device, at least some occurrences if any of the word or phrase in the text document and the audio stream;

means for extracting at least one of: text, and keywords, from the audio along with timing information representative of the temporal location of at least some of the text and keywords in the audio; and means for extracting at least one of: text, and keywords, from the text document along with position information representative of the position of at least some of the text and keywords in the text document.

2. The system of claim 1, wherein the means for presenting further presents timing information common to the text document and the audio stream.

3. The system of claim 2, wherein the means for presenting further presents at least one temporal relationship between occurrences of the word or phrase in the audio stream and occurrences of the word or phrase in the text document.

4. The system of claim 1, wherein the text document is a presentation file including pages of slides.

5. A computer implemented system for automatically associating audio from at least one audio source with text from at least one text document related to the audio, the system including a query system comprising:

means for accessing at least one text document;

mean for accessing at least one audio stream generated contemporaneously with a display of at least a portion of the text document;

means for automatically associating at least portions of the audio with at least respective portions of the text document;

means for permitting a user to specify at least one query word or phrase using a computer input device;

means for presenting in summary form, on a computer output device, at least some occurrences if any of the word or phrase in the text document and the audio stream; and means for determining, for at least portions of the text document, information representative of times when the portions were presented on a large screen display.

6. The system of claim 5, further comprising:

means for determining, for at least portions of the text document, information representative of times when the portions were removed from a large screen display.

7. The system of claim 1, further comprising:

means for electronically storing the audio or a transcript thereof in a database;

means for electronically storing the text document in a database; and means for receiving a user query, wherein the automatically associating means is executed before or after the query.

8. The system of claim 7, wherein the means for automatically associating includes means for associating at least a first portion of the text document with at least a first portion of the audio when both first portions include at least one key word in the user query.

9. The system of claim 7, wherein the associating means includes means for associating at least a first portion of the text document with at least a first portion of the audio when both first portions contain identical time stamps.

10. The system of claim 9, wherein the time stamps include at least one of: discrete times, and discrete time periods.

11. The system of claim 1, wherein the text document includes at least one presentation slide.

12. The system of claim 1, wherein the means for presenting in summary form presents, based on relevance to the query word or phrase, at least summaries of the text document and the audio stream.

13. The system of claim 1, wherein the audio stream is from a recording having both audio and video, the recording being generated contemporaneously with a display of at least a portion of the text document.

14. The system of claim 13, wherein the means for presenting presents in summary form at least portions of the video.

15. A computer system, comprising:

a data store holding at least one audio stream and at least one text source, the audio stream being based on audio associated with the text source; and a processor receiving a query for data in the audio stream or text source and in response enabling a user to access at least portions of tile audio stream and text source or symbols representative of one or more thereof simultaneously, wherein the processor extracts at least one of: text, and keywords, from the audio stream along with timing information representative of temporal location of at least some of the text and keywords in the audio stream, the processor further extracting at least one of: text, and keywords, from the text source along with position information representative of the position of at least some of the text and keywords in the text source.

16. The system of claim 15, wherein the audio stream represents audio generated contemporaneously with a display of the text source.

17. The system of claim 15, wherein the text source is at least one slide in a presentation.

18. The system of claim 15, wherein the processor associates at least portions of the audio stream with at least portions of the text source based on at least one of: the objects containing common key words, and the objects having substantially the same time stamps.

19. The system of claim 18, wherein the processor associates at least portions of the audio stream with at least portions of the text source based on the objects having substantially the same time stamps.

20. The system of claim 19, wherein the time stamps include at least one of: discrete times, and discrete time periods.

21. The system of claim 15, wherein the processor associates at least portions of the audio stream with at least portions of the text source based on the relevance of the portions to the query.

22. The system of claim 15, wherein the audio stream is from a recording having both audio and video, the recording being generated contemporaneously with a display of at least a portion of the text source.

23. The system of claim 22, wherein the processor presents in summary form at least portions of the video.

24. A computer program product comprising:

a computer program storage device readable by a computer; and a program on the program storage device and including program code elements embodying instructions executable by the computer for performing method steps for associating at least portions of a text document with at least portions of an audio signal or transcript of the audio signal, the audio signal having been generated contemporaneously with a large screen display of the text document, the method steps comprising:

simultaneously presenting, via a computer output device, at least symbols representative of the text document and audio signal to a user, such that the user can navigate between the text document and audio signal; and for at least portions of the text document, determining information representative of times when the portions were presented on a large screen display;

extracting at least one of text and keywords, from the audio signal along with timing information representative of the temporal location of at least some of the text and keywords in the audio signal, extracting at least one of text and keywords, from the text document along with position information representative of the position of at least some of the text and keywords in the text document, and wherein linking the audio with the text document is accomplished by associating at least a first portion of the text document with at least a first portion of the audio when both first portions include at least one key word in a user query.

25. The computer program device of claim 19, wherein the method steps further comprise:

for at least portions of the text document, determining information representative of times when the portions were removed from a large screen display.

26. The computer program device of claim 25, wherein the method steps further comprise:

electronically storing the audio signal or a transcript thereof in a database;

electronically storing the text document in a database; and receiving a user query, wherein the presenting step is undertaken before or after the query.

27. The computer program device of claim 26, wherein the presenting step is accomplished by associating at least a first portion of the text document with at least a first portion of the audio signal when both first portions include at least one key word in the user query.

28. The computer program device of claim 26, wherein the presenting step is accomplished by associating at least a first portion of the text document with at least a first portion of the audio signal when both first portions contain substantially identical time stamps.

29. The computer program device of claim 28, wherein the time stamps include at least one of: discrete times, and discrete time periods.

30. The computer program product of claim 24, wherein the symbols representative of the text document and audio signal are presented in ranked pairs.

31. The computer program product of claim 24, wherein the audio signal is from a recording having both audio and video, the recording being generated contemporaneously with a display of at least a portion of the text document.

32. The computer program product of claim 31, wherein the method steps include presenting, in summary form, at least portions of the video.

33. A computer-implemented method for associating audio from at least one audio source with at least one text document relating to the audio, the text document having been presented contemporaneously with the generation of the audio, comprising:

linking the audio with the text document;

associating at least portions of the audio with at least respective portions of the text document such that associated portions can be presented simultaneously on a computer output device; and for at least portions of the text document, determining information representative of times when the portions were presented on a large screen display;

extracting at least one of text and keywords, from the audio signal along with timing information representative of the temporal location of at least some of the text and keywords in the audio signal, extracting at least one of text and keywords, from the text document along with position information representative of the position of at least some of the text and keywords in the text document, and wherein linking the audio with the text document is accomplished by associating at least a first portion of the text document with at least a first portion of the audio when both first portions include at least one key word in a user query.

34. The method of claim 33, further comprising:

for at least portions of the text document, determining information representative of times when the portions were removed from a large screen display.

35. The method of claim 33, further comprising:

electronically storing the audio or a transcript thereof in a database;

electronically storing the text document in a database; and receiving a user query, wherein the linking step is undertaken before or after the query.

36. The method of claim 35, wherein the linking step is accomplished by associating at least a first portion of the text document with at least a first portion of the audio when both first portions contain identical time stamps.

37. The method of claim 36, wherein the time stamps include at least one of: discrete times, and discrete time periods.

38. The method of claim 35, wherein the text document includes at least one presentation slide.

39. The computer-implemented method of claim 24, comprising presenting symbols representative of the text document and audio signal in ranked pairs.

40. The computer-implemented method of claim 33, wherein the audio is from a recording having both audio and video, the recording being generated contemporaneously with a display of at least a portion of the text document, and further wherein the method steps include presenting, in summary form, at least portions of the video.

* * * * *